US011753792B2

(12) United States Patent
Konda et al.

(10) Patent No.: US 11,753,792 B2
(45) Date of Patent: Sep. 12, 2023

(54) LOADING MACHINE CONTROL DEVICE AND CONTROL METHOD

(71) Applicant: Komatsu Ltd., Tokyo (JP)

(72) Inventors: Tomoki Konda, Tokyo (JP); Yusuke Saigo, Tokyo (JP); Ryuta Okuwaki, Tokyo (JP); Kazuhiro Hatake, Tokyo (JP)

(73) Assignee: Komatsu Ltd., Tokyo (JP)

( * ) Notice: Subject to any disclaimer, the term of this patent is extended or adjusted under 35 U.S.C. 154(b) by 456 days.

(21) Appl. No.: 16/644,747

(22) PCT Filed: Aug. 13, 2018

(86) PCT No.: PCT/JP2018/030170
§ 371 (c)(1),
(2) Date: Mar. 5, 2020

(87) PCT Pub. No.: WO2019/150615
PCT Pub. Date: Aug. 8, 2019

(65) Prior Publication Data
US 2020/0263385 A1    Aug. 20, 2020

(30) Foreign Application Priority Data
Jan. 31, 2018    (JP) .................................. 2018-015624

(51) Int. Cl.
*E02F 3/43*    (2006.01)
*E02F 3/32*    (2006.01)
(Continued)

(52) U.S. Cl.
CPC ................ *E02F 3/435* (2013.01); *E02F 3/32* (2013.01); *E02F 3/437* (2013.01); *E02F 3/439* (2013.01);
(Continued)

(58) Field of Classification Search
CPC ... E02F 3/435; E02F 3/32; E02F 3/437; E02F 3/439; E02F 9/2004; E02F 9/2296; E02F 9/264; B60Y 2200/412
See application file for complete search history.

(56) References Cited

U.S. PATENT DOCUMENTS 5,835,874 A * 11/1998 Hirata ..................... E02F 3/435
60/426
6,058,344 A * 5/2000 Rowe .................... E02F 9/2041
701/50
(Continued)

FOREIGN PATENT DOCUMENTS

JP    50082101    7/1975
JP    H0971965 A * 3/1997 .............. E02F 9/203
(Continued)

OTHER PUBLICATIONS

JP2002115271A_MT.pdf (Year: 2022).*
(Continued)

*Primary Examiner* — Thomas Ingram
*Assistant Examiner* — Faris Asim Shaikh
(74) *Attorney, Agent, or Firm* — Fish & Richardson P.C.

(57) ABSTRACT

A movement processing unit is configured to generate operation signals of a work equipment and a swing body for moving a bucket to a loading point based on a start command of an automatic movement of the bucket. A stop processing unit is configured to brake a swing of the swing body based on a stop command of the automatic movement of the bucket, and is further configured to generate an operation signal for retreating the work equipment when a height of the bucket is lower than the loading point.

13 Claims, 6 Drawing Sheets

(51) Int. Cl.
*E02F 9/20* (2006.01)
*E02F 9/22* (2006.01)
*E02F 9/26* (2006.01)

(52) U.S. Cl.
CPC ....... *B60Y 2200/412* (2013.01); *E02F 9/2004* (2013.01); *E02F 9/2296* (2013.01); *E02F 9/264* (2013.01)

(56) References Cited

U.S. PATENT DOCUMENTS

| | | | | |
|---|---|---|---|---|
| 2009/0055056 | A1* | 2/2009 | Ooki | E02F 9/2296 701/50 |
| 2017/0058490 | A1* | 3/2017 | Kamado | E02F 9/2296 |
| 2018/0347147 | A1* | 12/2018 | Doi | E02F 9/2033 |
| 2019/0063041 | A1* | 2/2019 | Izumi | F02D 29/02 |
| 2020/0299924 | A1* | 9/2020 | Kurokawa | E02F 9/2033 |
| 2020/0399865 | A1* | 12/2020 | Tsukamoto | E02F 9/265 |

FOREIGN PATENT DOCUMENTS

| | | | | |
|---|---|---|---|---|
| JP | H09256407 | | 9/1997 | |
| JP | 2002115271 | | 4/2002 | |
| JP | 2002115271 | A * | 4/2002 | |
| JP | 3652100 | B2 * | 5/2005 | |
| JP | 3898111 | B2 * | 3/2007 | ............. E02F 9/166 |
| KR | 101695914 | B1 * | 1/2017 | |

OTHER PUBLICATIONS

Machine translation of JP-2002115271-A translated by JPlatPat on May 4, 2022 (Year: 2022).*
Machine translation of KR101695914B1 translated by Espacenet on Sep. 19, 2022 (Year: 2022).*
Machine translation of JP H0971965 A translated by Espacenet on Mar. 1, 2023 (Year: 2023).*
Machine translation of JP-3898111-B2 translated by Espacenet on Mar. 1, 2023 (Year: 2023).*
Machine translation of JP-3652100-B2 translated by Espacenet on Mar. 1, 2023 (Year: 2023).*

* cited by examiner

LOADING MACHINE CONTROL DEVICE AND CONTROL METHOD

CROSS-REFERENCE TO RELATED APPLICATIONS

This application is a National Stage application under 35 U.S.C. § 371 of International Application No. PCT/JP2018/030170, filed on Aug. 13, 2018, which claims priority to Japanese Patent Application No. 2018-015624, filed on Jan. 31, 2018. The contents of the prior applications are incorporated herein in their entirety.

TECHNICAL FIELD

The present invention relates to a loading machine control device and a control method therefor.
This application claims priority to Japanese Patent Application No. 2018-015624, filed Jan. 31, 2018, the contents of which are incorporated herein by reference.

BACKGROUND

Patent Document 1 discloses a technology relating to automatic loading control of a loading machine. The automatic loading control is a control in which the control device receives a designation of a loading point from an operator or the like of the loading machine, and the control device controls motions of the swing body and the work equipment to move the bucket to the loading point.

PRIOR ART

Patent Document

[Patent Document 1] Japanese Unexamined Patent Publication No. 1998-256407.

SUMMARY OF THE INVENTION

Problems to be Solved by the Invention

In the automatic loading control of the loading machine, it may be necessary to stop automatic loading control in a case such as an occurrence of a failure or the like. At this time, there is a possibility that a swing motion cannot be stopped immediately due to the inertia of the swing motion of the swing body provided with the work equipment. On the other hand, since the inertia of a vertical motion of the work equipment is smaller than the inertia of the swing motion of the swing body provided with the work equipment, the motion of the work equipment stops earlier than the swing motion of the swing body. Therefore, when the automatic loading control is stopped during the swing motion and the raising of the work equipment, since the swinging is continued by inertia in a state where the raising of the work equipment is stopped, a trajectory of a bucket becomes lower than a target trajectory in the control, and there is a possibility that the bucket and the loading object interfere with each other.

An object of the present invention is to provide a control device for a loading machine and a control method therefor, which control a stop of automatic loading in view of a position of a loading object.

Means to Solve the Problem

A first aspect of the present invention provides a control device of the loading machine that controls a loading machine including a swing body swinging about a center of swing thereof and a work equipment attached to the swing body and having a bucket, the control device including: a movement processing unit configured to generate an operation signal of the work equipment and the swing body for moving the bucket to a loading point based on an start command of an automatic movement of the bucket; and a stop processing unit configured to brake the swing of the swing body based on a stop command of the automatic movement of the bucket, and further configured to generate an operation signal for retracting the work equipment when a height of the bucket is lower than the loading point.

Effect of the Invention

According to the above aspect, the control device of the loading machine is possible to appropriately control a stop of the automatic loading in consideration of the position of the loading object.

EMBODIMENTS OF THE INVENTION

Hereinafter, the embodiments will be described in detail with reference to the drawings.

First Embodiment

Figure 1:
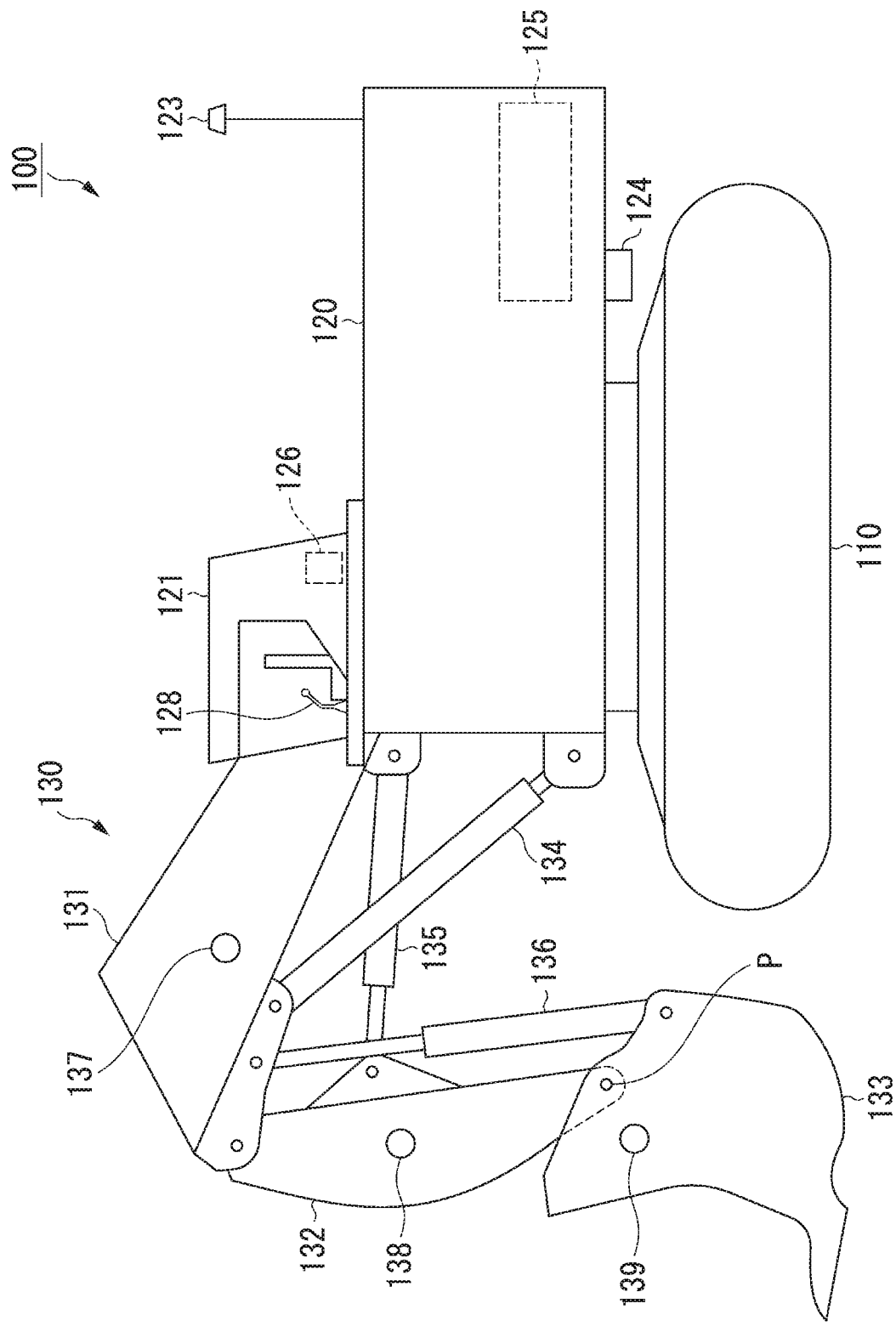
FIG. 1 is a schematic diagram showing a configuration of a loading machine according to a first embodiment.

Configuration of Loading Machine
FIG. 1 is a schematic diagram showing a configuration of the loading machine according to a first embodiment.

A loading machine 100 is a work machine for loading earth onto a transport vehicle or the like. The loading machine 100 according to the first embodiment is a hydraulic excavator. The loading machine 100 according to another embodiment may be a loading machine other than a hydraulic excavator. Although the loading machine 100 shown in FIG. 1 is a face shovel, it may also be a backhoe shovel or a rope shovel.

The loading machine 100 includes a traveling body 110, a swing body 120 supported by the traveling body 110, and a work equipment 130 operated by hydraulic pressure and supported by the swing body 120. The swing body 120 is supported so as to freely swing about a center of swing thereof.

The work equipment 130 includes a boom 131, an arm 132, a bucket 133, a boom cylinder 134, an arm cylinder 135, a bucket cylinder 136, a boom angle sensor 137, an arm angle sensor 138, and a bucket angle sensor 139.

The base end portion of the boom 131 is attached to the swing body 120 via a pin.

The arm 132 connects the boom 131 to the bucket 133. The base end portion of the arm 132 is attached to the tip end portion of the boom 131 via a pin.

The bucket 133 is provided with a blade for excavating earth, and the like, and a container for housing excavated earth. The base end portion of the bucket 133 is attached to the tip end portion of the arm 132 via a pin.

The boom cylinder 134 is a hydraulic cylinder for actuating the boom 131. A base end portion of the boom cylinder 134 is attached to the swing body 120. The tip end portion of the boom cylinder 134 is attached to the boom 131.

The arm cylinder 135 is a hydraulic cylinder for driving the arm 132. A base end portion of the arm cylinder 135 is attached to the boom 131. The tip end portion of the arm cylinder 135 is attached to the arm 132.

The bucket cylinder 136 is a hydraulic cylinder for driving the bucket 133. A base end portion of the bucket cylinder 136 is attached to the boom 131. The tip end portion of the bucket cylinder 136 is attached to the bucket 133.

The boom angle sensor 137 is attached to the boom 131 and detects an inclination angle of the boom 131.

The arm angle sensor 138 is attached to the arm 132 and detects an inclination angle of the arm 132.

The bucket angle sensor 139 is attached to the bucket 133 and detects an inclination angle of the bucket 133.

The boom angle sensor 137, the arm angle sensor 138, and the bucket angle sensor 139 according to the first embodiment detect each inclination angle with respect to a ground plane. The angle sensor according to another embodiment is not limited thereto, and the inclination angle with respect to other reference plane may also be detected. For example, in another embodiment, the angle sensor may detect a relative rotation angle by a potentiometer provided at the base end portion of the boom 131, the arm 132 and the bucket 133, and may detect each inclination angle by measuring the cylinder length of the boom cylinder 134, the arm cylinder 135 and the bucket cylinder 136 and converting the cylinder length into the angle.

The swing body 120 is provided with a cab 121. Inside the cab 121, there are provided an operator's seat 122 for an operator to seat, an operation device 123 for operating the loading machine 100, and a detection device 124 for detecting a three dimensional position of an object present in a detecting direction. The operation device 123 generates an operation signal of the boom cylinder 134, an operation signal of the arm cylinder 135, an operation signal of the bucket cylinder 136, a swing operation signal of the swing body 120 to the left and right, and a traveling operation signal for forward and backward movement of the traveling body 110 in response to the operation of the operator, and outputs the generated signals to a control device 128. The operation device 123 generates a loading command signal for causing the work equipment 130 to start automatic loading control according to the operation of the operator and a loading stop command signal for stopping the automatic loading control, and outputs the loading command signal to the control device 128. The loading command signal is an example of a start command of automatic movement of the bucket 133. The loading stop command signal is an example of a stop command of automatic movement of the bucket 133. The operation device 123 is constituted by, for example, a lever, an alternate switch and a pedal. The loading command signal and the loading stop command signal are generated by the operation of the alternate switch. For example, when the alternate switch is turned on, the loading command signal is output, and when the alternate switch is turned off, the loading stop command signal is output. The operation device 123 is disposed in the vicinity of the operator's seat 122. The operation device 123 is positioned within a range that is possible to be operated by the operator when the operator is seated on the operator's seat 122.

Examples of the detection device 124 include a stereo camera, a laser scanner, an ultra-wide band (UWB) distance measuring device, and the like. The detection device 124 is provided, for example, such that the detecting direction is directed toward a front of the cab 121 of the loading machine 100. The detection device 124 specifies the three dimensional position of the object in a coordinate system based on the position of the detection device 124.

The loading machine 100 according to the first embodiment operates in accordance with the operation of an operator sitting on the operator's seat 122, but another embodiment is not limited thereto. For example, the loading machine 100 according to another embodiment may operate in a manner such that an operation signal and a loading command signal are transmitted and operated by remote operation of an operator operating outside the loading machine 100.

The loading machine 100 includes a position and azimuth direction calculator 125, an inclination measuring instrument 126, a hydraulic device 127, and a control device 128.

The position and azimuth direction calculator 125 calculates the position of the swing body 120 and an azimuth direction in which the swing body 120 faces. The position and azimuth direction calculator 125 includes two receivers for receiving a positioning signal from an artificial satellite constituting a GNSS. The two receivers are located at different positions of the swing body 120. The position and azimuth direction calculator 125 detects the position of a representative point (the origin of an excavator coordinate system) of the swing body 120 in a field coordinate system based on the positioning signal received by the receivers.

The position and azimuth direction calculator 125 calculates the azimuth direction in which the swing body 120 faces as a relation between an installation position of the other receiver with respect to an installation position of one receiver by using the respective positioning signals received by the two receivers.

The inclination measuring instrument 126 measures an acceleration and angular velocity (swing speed) of the swing body 120, and detects an attitude (for example, roll angle, pitch angle, yaw angle) of the swing body 120 based on the measurement result. The inclination measuring instrument 126 is installed, for example, on a lower surface of the swing body 120. For example, an inertial measurement unit (IMU) may be used as the inclination measuring instrument 126.

The hydraulic device 127 includes a hydraulic oil tank, a hydraulic pump, and a flow control valve. The hydraulic pump is driven by a power of an engine (not shown), and supplies hydraulic oil to the boom cylinder 134, the arm cylinder 135, the bucket cylinder 136, a swing motor (not shown) for rotating the swing body 120 and a travel motor (not shown) for driving the traveling body 110, via the flow control valve. The flow control valve has a spool having a rod shape, and controls a flow rate of hydraulic oil supplied to the boom cylinder 134, the arm cylinder 135, and the bucket cylinder 136 in accordance with a position of the spool. The spool is driven based on control commands received from the control device 128. That is, an amount of hydraulic oil supplied to the boom cylinder 134, the arm cylinder 135, and the bucket cylinder 136 is controlled by the control device 128.

The control device 128 receives an operation signal from the operation device 123. The control device 128 drives the work equipment 130, the swing body 120, or the traveling body 110 based on the received operation signal.

Configuration of Control Device

Figure 2:
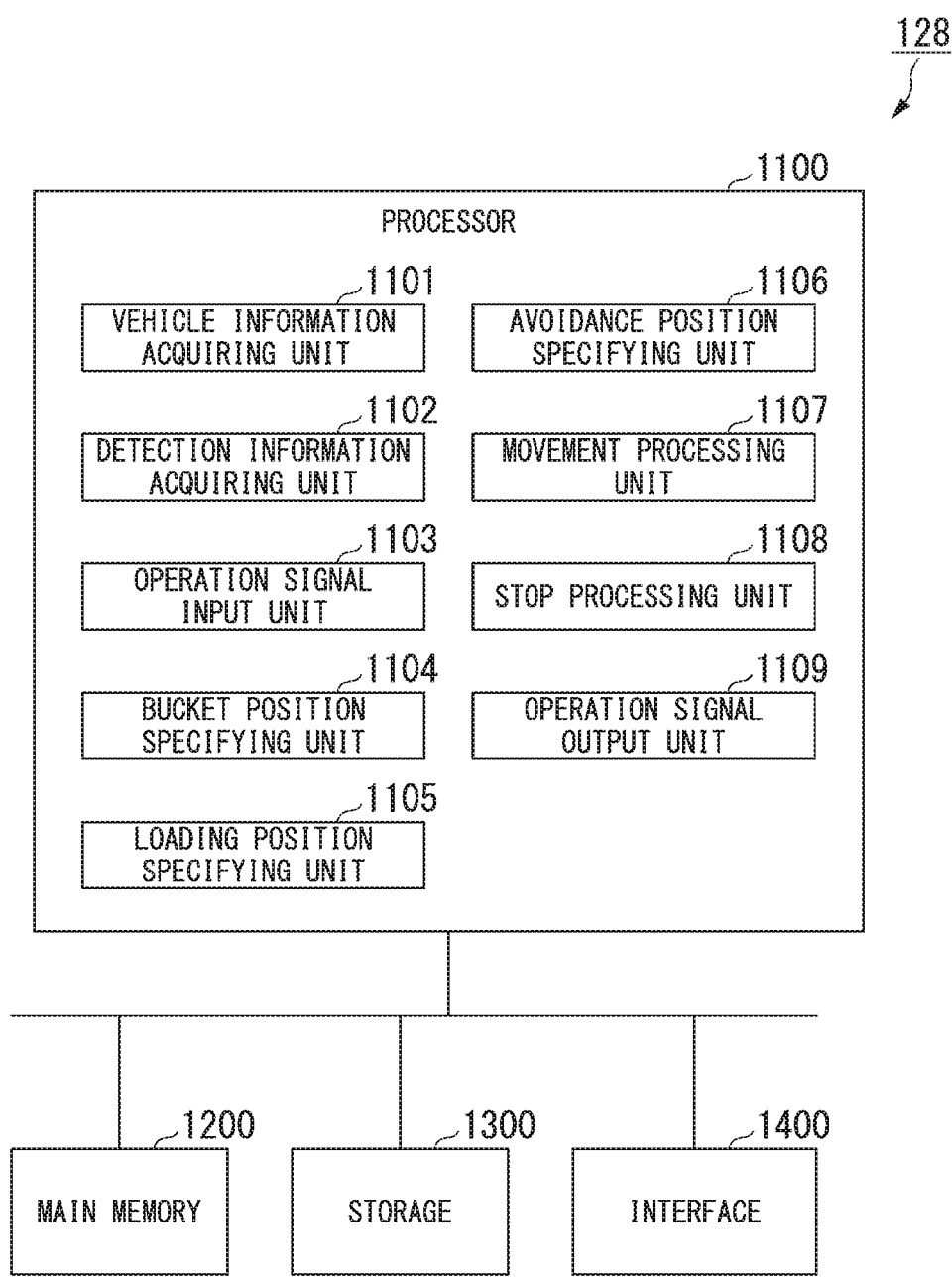
FIG. 2 is a schematic block diagram showing a configuration of a control device according to the first embodiment.

FIG. 2 is a schematic block diagram showing a configuration of the control device according to the first embodiment.

The control device 128 is a computer that includes a processor 1100, a main memory 1200, a storage 1300, and an interface 1400. The storage 1300 stores a program. The processor 1100 reads the program from the storage 1300, loads the program in the main memory 1200, and executes processing in accordance with the program.

Examples of the storage 1300 include an HDD, an SSD, a magnetic disk, a magneto-optical disk, a CD-ROM, a DVD-ROM, and the like. The storage 1300 may be an internal medium directly connected to a common communication line of the control device 128 or an external medium connected to the control device 128 via the interface 1400. The storage 1300 is a non-transitory tangible storage medium.

The processor 1100 includes a vehicle information acquiring unit 1101, a detection information acquiring unit 1102, an operation signal input unit 1103, a bucket position specifying unit 1104, a loading position specifying unit 1105, an avoidance position specifying unit 1106, a movement processing unit 1107, a stop processing unit 1108, and an operation signal output unit 1109, by executing the program.

The vehicle information acquiring unit 1101 acquires the swing speed, position and azimuth direction of the swing body 120, each inclination angle of the boom 131, the arm 132 and the bucket 133, the traveling speed of the traveling body 110, and the attitude of the swing body 120. The information relating to the loading machine 100 acquired by the vehicle information acquiring unit 1101 is hereinafter referred to as vehicle information.

The detection information acquiring unit 1102 acquires three dimensional position information from the detection device 124, and specifies the position and shape of a loading object 200 (for example, a transport vehicle or hopper).

The operation signal input unit 1103 receives input of an operation signal from the operation device 123. The operation signal of the boom 131, the operation signal of the arm 132, the operation signal of the bucket 133, the swing operation signal of the swing body 120, the traveling operation signal of the traveling body 110, and the loading command signal and the loading stop command signal of the loading machine 100 are included in the operation signal.

Figure 3:
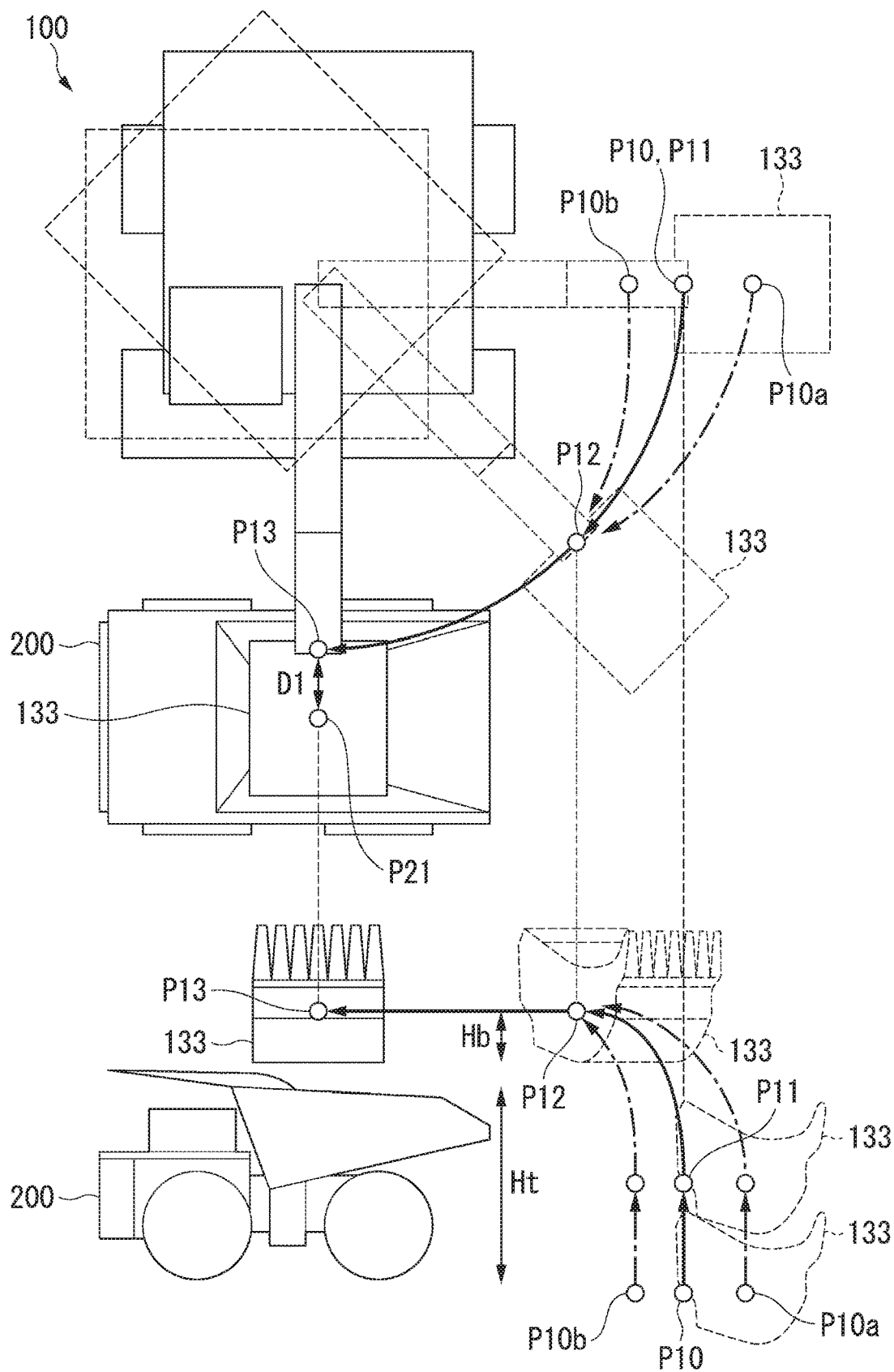
FIG. 3 is a diagram showing an example of a path of a bucket according to the first embodiment.

Based on the vehicle information acquired by the vehicle information acquiring unit 1101, the bucket position specifying unit 1104 specifies the position P of the tip of the arm 132 in the excavator coordinate system and a height Hb from the tip of the arm 132 to the lowest point of the bucket 133. The lowest point of the bucket 133 is a point in which the distance from the ground surface to an outer shape of the bucket 133 is the shortest. In particular, the bucket position specifying unit 1104 specifies, as the excavation completion position P10, a position P of the tip of the arm 132 at the time when the input of the loading command signal is accepted. FIG. 3 is a diagram showing an example of a path of a bucket according to the first embodiment. Specifically, the bucket position specifying unit 1104 obtains a vertical component and a horizontal component of a length of the boom 131 based on the inclination angle of the boom 131 and the known length of the boom 131 (the distance from the pin of the base end portion to the pin of the tip end portion). Similarly, the bucket position specifying unit 1104 obtains a vertical component and a horizontal component of the length of the arm 132. A bucket position specifying unit 1104 specifies, as the position P of the tip of the arm 132 (the position P of the pin of the tip end portion of the arm 132 shown in FIG. 1), a position apart from the position of the loading machine 100 by the sum of the vertical component and the sum of the horizontal component of the length of the boom 131 and the arm 132 in the direction specified from the azimuth direction and attitude of the loading machine 100. Further, the bucket position specifying unit 1104 specifies the lowest point in the vertical direction of the bucket 133 based on the inclination angle of the bucket 133 and the known shape of the bucket 133, and specifies the height Hb from the tip of the arm 132 to the lowest point.

When the loading command signal is input to the operation signal input unit 1103, the loading position specifying unit 1105 specifies a loading position P13 based on the position and shape of the loading object 200 specified by the detection information acquiring unit 1102. The loading position specifying unit 1105 converts a loading point P21 indicated by the position information of the loading object 200 from the site coordinate system to the excavator coordinate system based on the position, the azimuth direction and the attitude of the swing body 120 acquired by the vehicle information acquiring unit 1101. The loading position specifying unit 1105 specifies, as a plane position of the loading position P13, a position apart from the specified loading point P21 by the distance D1 from a center of the bucket 133 to the tip of the arm 132 in the direction in which the swing body 120 of the loading machine 100 faces. That is, when the tip of the arm 132 is positioned at the loading position P13, the center of the bucket 133 is located at the loading point P21. Accordingly, the control device 128 is possible to move the center of the bucket 133 to the loading point P21 by controlling the tip of the arm 132 to move to the loading position P13. The loading position specifying unit 1105 specifies the height of the loading position P13 by adding the height Hb from the tip of the arm 132 specified by the bucket position specifying unit 1104 to the lowest point of the bucket 133 and the height of a control margin of the bucket 133 to the height Ht of the loading object 200. In another embodiment, the loading position specifying unit 1105 may specify the loading position P13 without adding the height of the control margin. That is, the loading position specifying unit 1105 may specify the height of the loading position P13 by adding the height Hb to the height Ht.

The avoidance position specifying unit 1106 specifies an interference avoidance position P12 that the bucket 133 does not interfere with the loading object 200 based on the loading position P13 specified by the loading position specifying unit 1105, the position of the loading machine 100 acquired by the vehicle information acquiring unit 1101, and the position and the shape of the loading object 200 specified by the detection information acquiring unit 1102. The interference avoidance position P12 has the same height as the loading position P13, is a position at which the distance from the center of swing of the swing body 120 is equal to the distance from the center of swing to the loading position P13, and is a position at which the loading object 200 is not present downward. The avoidance position specifying unit 1106 specifies, for example, a circle which is centered on the center of swing of the swing body 120 and whose radius is the distance between the center of swing and the loading position P13, and specifies a position at which the outer shape of the bucket 133 does not interfere with the loading object 200 in a plan view among positions on the circle and the position which is closest to the loading position P13 as the interference avoidance position P12. The avoidance position specifying unit 1106 is possible to determine whether or not the loading object 200 and the bucket 133 interfere with each other based on the position and shape of the loading object 200 and the known shape of the bucket 133. Here, the "same height" and the "the distances are equal" are not necessarily limited to those in which a height or a distance is completely matched, and it is assumed that some errors or margins are allowed.

When the operation signal input unit 1103 receives an input of the loading command signal, the movement processing unit 1107 generates an operation signal for moving the bucket 133 to the loading position P13 based on the loading position P13 specified by the loading position specifying unit 1105 and the interference avoidance position P12 specified by the avoidance position specifying unit 1106. That is, the movement processing unit 1107 generates the operation signal so that the bucket reaches the loading position P13 from the excavation completion position P10 through the swing start position P11 and the interference avoidance position P12. Also, the movement processing unit 1107 generates the operation signal of the bucket 133 so as to not change the angle of the bucket 133 even when the boom 131 and the arm 132 are driven.

When the operation signal input unit 1103 receives an input of the loading stop command signal in the middle of the movement from step P10 to step P13, the stop processing unit 1108 generates an operation signal for braking the swing body 120 and the work equipment 130. Since the inertia moment of the swing body 120 is larger than that of the work equipment 130, the stop processing unit 1108 outputs an operation signal for raising the work equipment 130 until the swing body 120 stops after receiving the loading stop command signal or until the work equipment 130 reaches a predetermined height. As a result, after the stop processing unit 1108 receives the input of the loading stop command signal, the stop processing unit 1108 is possible to prevent the work equipment 130 from coming into contact with the loading object 200 by the swing due to the inertia of the swing body 120.

The operation signal output unit 1109 outputs an operation signal input to the operation signal input unit 1103, an operation signal generated by the movement processing unit 1107, or an operation signal generated by the stop processing unit 1108.

Motion

When the operator of the loading machine 100 determines that the loading machine 100 and the loading object 200 are in a positional relationship that is capable of performing loading, the operator turns on the alternate switch of the operation device 123. Thus, the operation device 123 generates and outputs the loading command signal.

Figure 4:
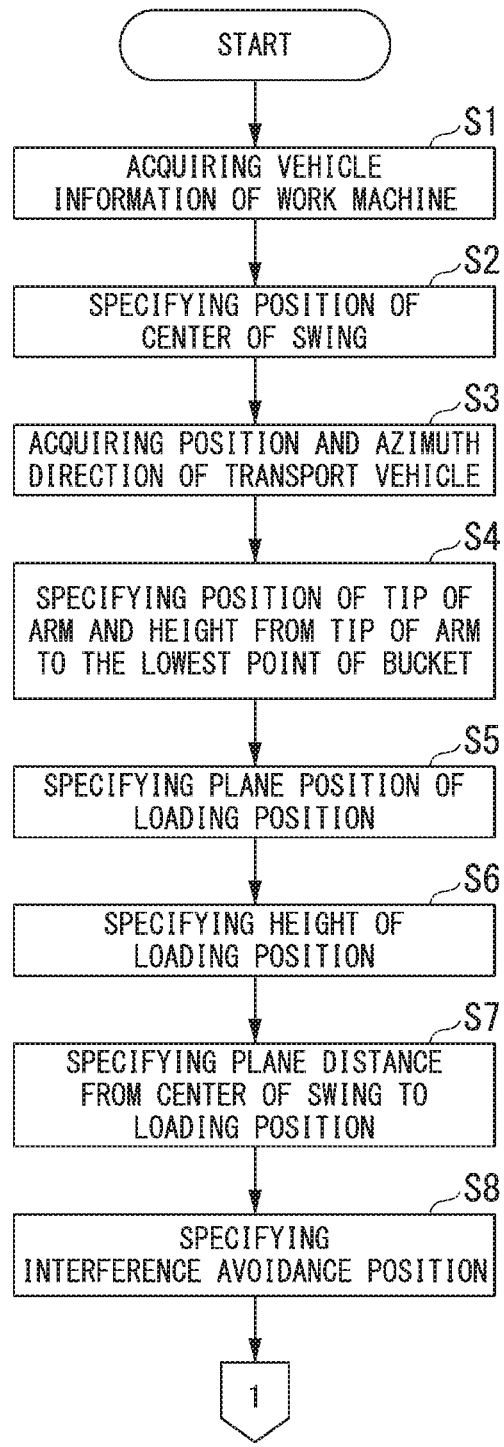
FIG. 4 is a flowchart showing an automatic loading control method according to the first embodiment.
Figure 5:
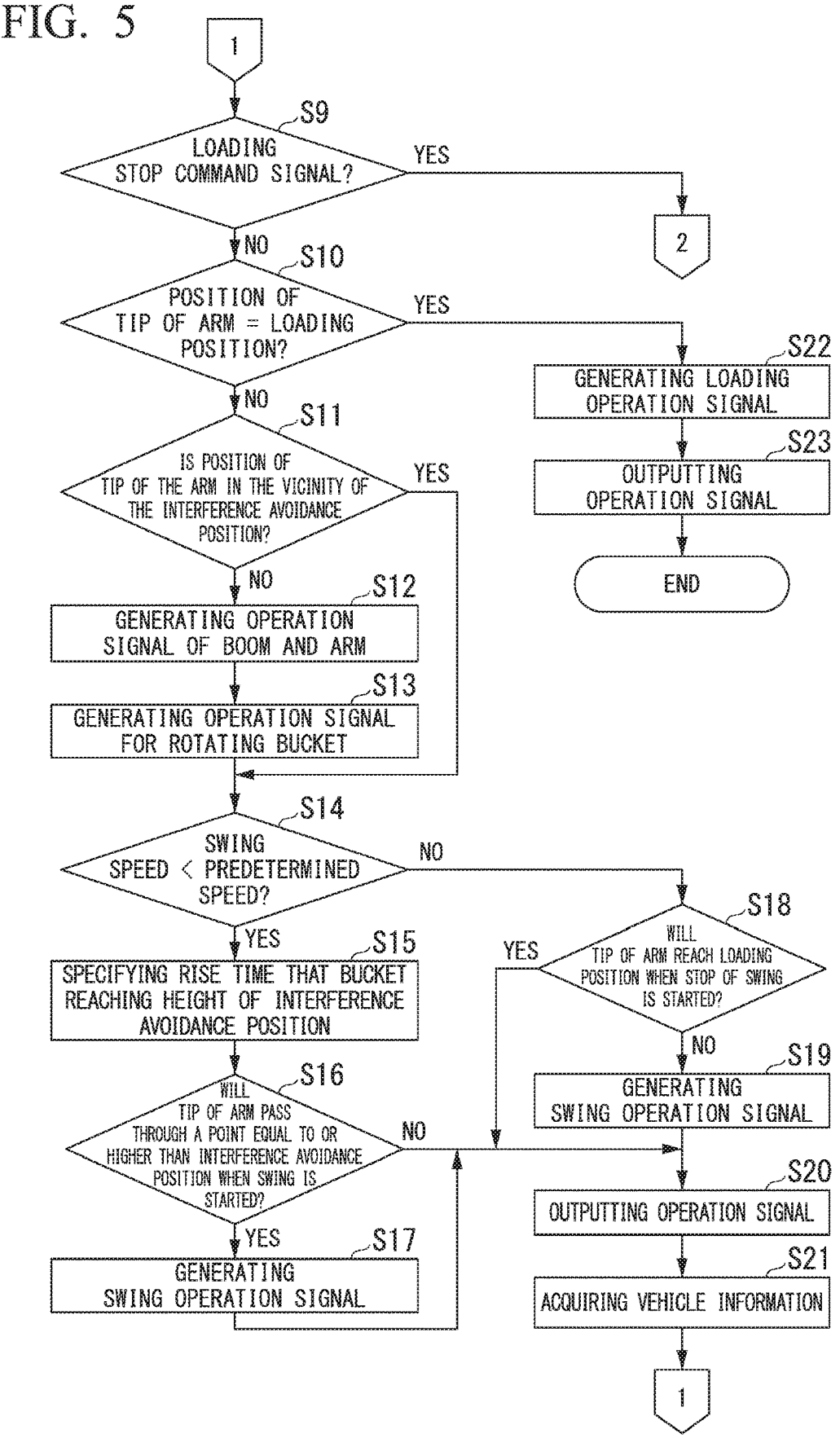
FIG. 5 is a flowchart showing the automatic loading control method according to the first embodiment.
Figure 6:
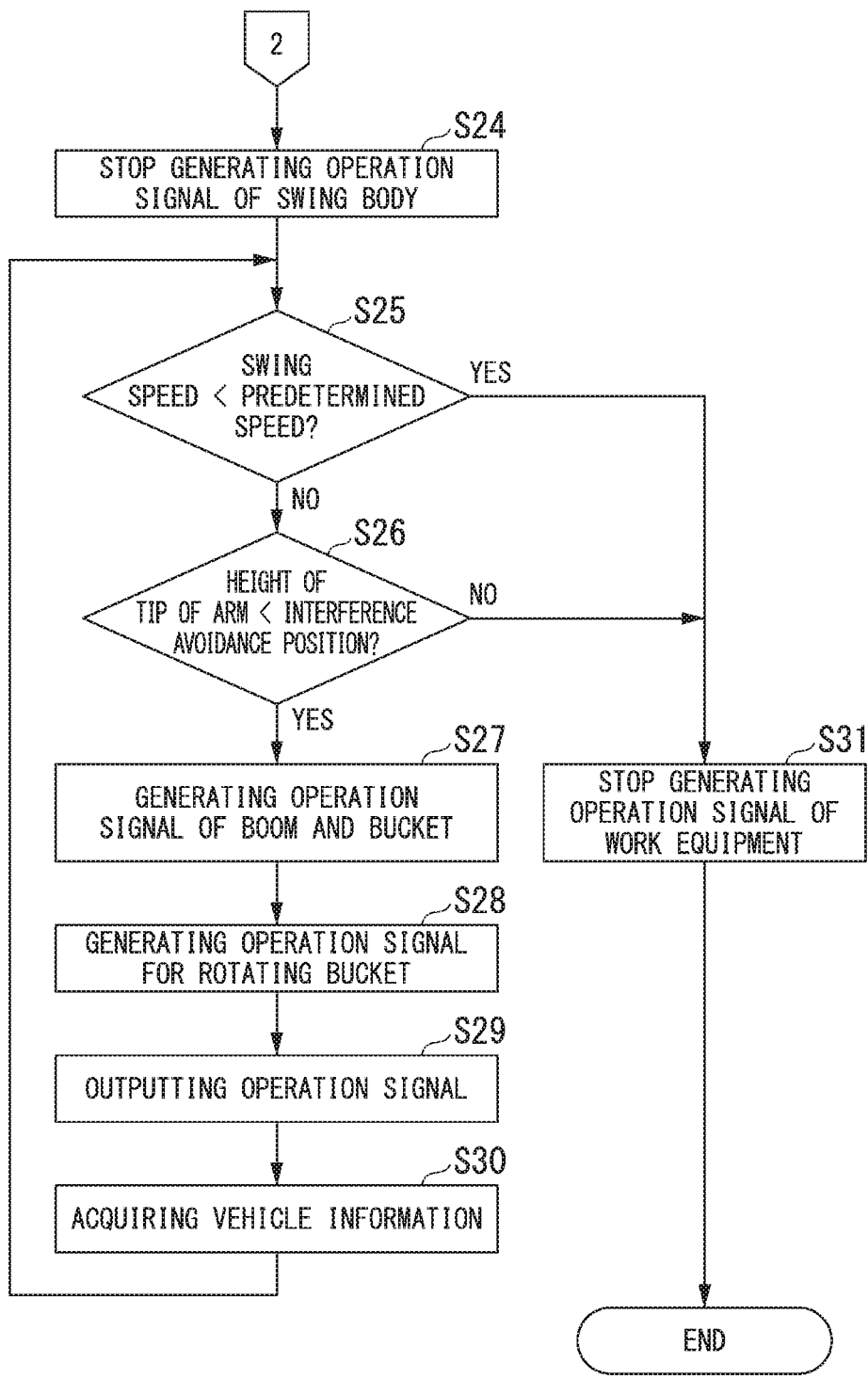
FIG. 6 is a flowchart showing an automatic loading control method according to a first embodiment.

FIGS. 4 to 6 are flowcharts showing the automatic loading control method according to the first embodiment. When the control device 128 receives the input of the loading command signal from the operator, the control device 128 executes the automatic loading control shown in FIGS. 4 to 6.

The vehicle information acquiring unit 1101 acquires the position and azimuth direction of the swing body 120, the inclination angle of each of the boom 131, the arm 132 and the bucket 133, and the attitude and the swing speed of the swing body 120 (step S1). The bucket position specifying unit 1104 specifies the position of the center of swing of the swing body 120 based on the position and the azimuth direction of the swing body 120 acquired by the vehicle information acquiring unit 1101 (step S2). The detection information acquiring unit 1102 acquires the three dimensional position information of the loading object 200 from the detection device 124, and specifies the position and shape of the loading object 200 based on the three dimensional position information (step S3).

Based on the vehicle information acquired by the vehicle information acquiring unit 1101, the bucket position specifying unit 1104 specifies the position P of the tip of the arm 132 at the time of inputting the loading command signal and the height Hb from the tip of the arm 132 to the lowest point of the bucket 133 (step S4). The bucket position specifying unit 1104 specifies the position P as the excavation completion position P10.

The loading position specifying unit 1105 converts the position information of the loading object 200 acquired by the detection information acquiring unit 1102 from the site coordinate system to the excavator coordinate system based on the position, the azimuth direction and the attitude of the swing body 120 acquired in the step S1. The loading position specifying unit 1105 specifies a plane position of the loading position P13 based on the position and shape of the loading object 200 specified by the detection information acquiring unit 1102 (step S5). At this time, the loading position specifying unit 1105 specifies the height of the loading position P13 by adding the height Hb from the tip end of the arm 132 specified in step S3 to the lowest point of the bucket 133 and the height of the control margin of the bucket 133 to the height Ht of the loading object 200 (step S6).

The avoidance position specifying unit 1106 specifies a plane distance from the center of swing specified in step S2 to the loading position P13 (step S7). The avoidance position specifying unit 1106 specifies, as the interference avoidance position P12, a position which is apart from the center of swing by a specified plane distance, at which the outer shape of the bucket 133 does not interfere with the loading object 200 in the plan view, and which is closest to the loading position P13 (step S8).

The operation signal input unit 1103 determines whether or not input of the loading stop command signal has been accepted from the operator (step S9). That is, the operation signal input unit 1103 determines whether or not the alternate switch is turned off during the automatic loading control.

When the input of the loading stop command signal is not accepted (step S9: NO), the movement processing unit 1107 determines whether or not the position of the tip end of the arm 132 reaches the loading position P13 (step S10). When the position of the tip of the arm 132 does not reach the loading position P13 (step S10: NO), the movement processing unit 1107 determines whether or not the position of the tip end of the arm 132 is in the vicinity of the interference avoidance position P12 (step S11). For example, the movement processing unit 1107 determines whether or not a difference between the height of the tip of the arm 132 and the height of the interference avoidance position P12 is less than a predetermined threshold, or a difference between a plane distance from the center of swing of the swing body 120 to the tip of the arm 132 and a plane distance from the center of swing to the interference avoidance position P12 is less than the predetermined threshold. When the position of the tip of the arm 132 is not in the vicinity of the interference avoidance position P12 (step S11: NO), the movement processing unit 1107 generates an operation signal of the boom 131 and the arm 132 that moves the tip of the arm 132 to the interference avoidance position P12 (step S12). At this time, the movement processing unit 1107 generates an operation signal based on the position and velocity of each of the boom 131 and the arm 132.

The movement processing unit 1107 calculates the sum of angular velocities of the boom 131 and the arm 132 based on the generated operation signal of the boom 131 and the arm 132 and generates an operation signal for rotating the bucket 133 at the same speed as the sum of the angular velocities (step S13). As a result, the movement processing unit 1107 is possible to generate an operation signal for holding the ground angle of the bucket 133. In another embodiment, the movement processing unit 1107 may generate an operation signal for rotating the bucket 133 so as to equalize the ground angle of the bucket 133 calculated from the detected values of the boom angle sensor 137, the arm angle sensor 138, and the bucket angle sensor 139 to the ground angle of the bucket 133 at the time of starting the automatic control.

When the position of the tip of the arm 132 is in the vicinity of the interference avoidance position P12 (step S11: YES), the movement processing unit 1107 does not generate an operation signal for driving the work equipment. That is, the operation signals of the boom 131, the arm 132, and the bucket 133 are not generated.

Based on the vehicle information acquired by the vehicle information acquiring unit 1101, the movement processing unit 1107 determines whether or not the swing speed of the swing body 120 is less than the predetermined speed (step S14). That is, the movement processing unit 1107 determines whether or not the swing body 120 is in the swing state.

When the swing speed of the swing body 120 is less than the predetermined speed (step S14: YES), the movement processing unit 1107 specifies a rise time that is a time of the height of the bucket 133 reaching the height of the interference avoidance position P12 from the height of the excavation completion position P10 (step S15). When the swing operation signal is output from the current time based on the rise time of the bucket 133, the movement processing unit 1107 determines whether or not the tip of the arm 132 will pass through the interference avoidance position P12 or a point higher than the interference avoidance position P12 (step S16). When the swing operation signal is output from the current time and when the tip of the arm 132 will pass through the interference avoidance position P12 or a point higher than the interference avoidance position P12 (step S16: YES), the movement processing unit 1107 generates the swing operation signal (step S17).

When the swing operation signal is output from the current time and when the tip of the arm 132 will pass through a point lower than the interference avoidance position P12 (step S16: NO), the movement processing unit 1107 does not generate the swing operation signal.

When the swing speed of the swing body 120 is equal to or higher than the predetermined speed (step S14: NO), the movement processing unit 1107 determines whether or not the tip of the arm 132 will reach the loading position P13 when the output of the swing operation signal is stopped from the current time (when the braking of the swing is started) (step S18). After stopping the output of the swing operation signal, the swing body 120 continues to swing by inertia while decelerating, and then stops. When the output of the swing operation signal is stopped from the current time and when the tip of the arm 132 will reach the loading position P13 (step S18: YES), the movement processing unit 1107 does not generate the swing operation signal. Thus, the braking of the swing body 120 is started.

On the other hand, when the output of the swing operation signal is stopped from the current time (step S18: NO) and the tip of the arm 132 will stop before the loading position P13, the movement processing unit 1107 generates the swing operation signal (step S19).

When at least one signal from the operation signals of the boom 131, the arm 132 and the bucket 133 and the swing operation signal of the swing body 120 is generated in the processing from step S10 to step S19, the operation signal output unit 1109 outputs the generated operation signal to the hydraulic device 127 (step S20). Then, the vehicle information acquiring unit 1101 acquires vehicle information (step S21). As a result, the vehicle information acquiring unit 1101 is possible to acquire vehicle information after being driven by the output operation signal. The control device 128 returns the processing to step S9, and repeatedly executes the generation of the operation signal.

On the other hand, in step S10, when the position of the tip of the arm 132 reaches the loading position P13 (step S10: YES), the movement processing unit 1107 does not generate the operation signal. Accordingly, when the position of the tip of the arm 132 reaches the loading position P13, the work equipment 130 and the swing body 120 are stopped. When the position of the tip of the arm 132 reaches the loading position P13 (step S10: YES), in other words, when the movement processing unit 1107 has not generated the operation signal in the processing from step S10 to step S19 and when the work equipment 130 and the swing body 120 are stationary, the movement processing unit 1107 generates an operation signal that causes the bucket 133 to perform loading motion (step S22). Examples of the operation signal for causing the bucket 133 to perform loading motion include an operation signal for rotating the bucket 133 in the loading direction and an operation signal for opening a clamshell bucket when the bucket 133 is a clamshell type. The operation signal output unit 1109 outputs the generated operation signal to the hydraulic device 127 (step S23). Then, the control device 128 terminates the automatic loading control.

The motion of the loading machine 100 at the time of automatic loading control will now be described with reference to FIG. 3.

When automatic loading control is started, the boom 131 and the arm 132 rise from the excavation completion position P10 toward the swing start position P11. At this time, the bucket 133 is driven so as to maintain an angle of when excavation is completed.

When the tip of the arm 132 reaches the swing start position P11, the swing body 120 starts swing toward the loading position P13. At this time, since the tip of the arm 132 does not reach the height of the interference avoidance position P12, the boom 131 and the arm 132 are continuously raised. At this time, as shown in FIG. 3, when the distance from the center of swing to the tip (position P10a and position P10b) of the arm 132 is different from the distance from the center of swing to the interference avoidance position P12, the control device 128 also moves the work equipment 130 in a swing radius direction so that the distance from the center of swing to the tip of the arm 132 is equal to the distance from the center of swing to the interference avoidance position P12. The boom 131, the arm 132, and the bucket 133 are decelerated so that the height of the tip of the arm 132 is equal to the interference avoidance position P12 on the process of moving the tip of the arm 132 from the swing start position P11 to the interference avoidance position P12.

When the tip of the arm 132 reaches the interference avoidance position P12, the driving of the work equipment 130 is stopped. On the other hand, the swing body 120 continues to swing. That is, during the period from the interference avoidance position P12 to the loading position P13, the tip of the arm 132 is moved only by swing the swing body 120 without relying on the driving of the work equipment 130. During the movement of the arm 132 from the swing start position P11 to the loading position P13, the swing body 120 decelerates so that the position of the tip of the arm 132 becomes equal to the loading position P13.

When the tip of the arm 132 reaches the loading position P13, the driving of the work equipment 130 and the swing body 120 is stopped. Thereafter, the bucket 133 executes the loading motion.

By the automatic loading control described above, the loading machine 100 can automatically load the earth, which has been picked up by the bucket 133, into the loading object 200. The operator repeatedly executes the excavation by the work equipment 130 and the automatic loading control by inputting the loading command signal so that the loading amount of the loading object 200 does not exceed the maximum loading amount.

On the other hand, when the operation signal input unit 1103 receives the input of the loading stop command signal in step S9 (step S9: YES), the stop processing unit 1108 stops the generation of the operation signal of the swing body 120 (step S24). As a result, the swing body 120 starts to be braked. In addition, when the loading machine 100 is provided with a braking device for braking the swing motion, the braking control signal may be output to the braking device in addition to stopping the generation of the operation signal. Examples of the braking device include a brake valve provided inside the hydraulic device 127, a friction brake such as a disc brake and a drum brake. Based on the vehicle information acquired by the vehicle information acquiring unit 1101, the stop processing unit 1108 determines whether or not the swing speed of the swing body 120 is less than the predetermined speed (step S25). That is, the stop processing unit 1108 determines whether or not the swing body 120 is in a swing state.

When the swing speed of the swing body 120 is equal to or more than the predetermined speed (step S25: NO), that is, when the swing body 120 is in the swing state, the stop processing unit 1108 determines whether or not the height of the tip of the arm 132 is less than the height of the interference avoidance position P12 (step S26). When the height of the bucket 133 is less than the height of the interference avoidance position P12 (step S26: YES), the stop processing unit 1108 generates an operation signal for raising the boom 131 and the arm 132 (step S27). Further, the movement processing unit 1107 calculates the sum of angular velocities of the boom 131 and the arm 132 based on the generated operation signal of the boom 131 and the arm 132 and generates an operation signal for rotating the bucket 133 at the same speed as the sum of the angular velocities (step S28).

Then, the operation signal output unit 1109 outputs the operation signal of the work equipment 130 generated by the stop processing unit 1108 to the hydraulic device 127 (step S29). That is, when the swing body 120 is swinging and the height of the tip of the arm 132 is less than the height of the interference avoidance position P12, the stop processing unit 1108 does not stop generating the operation signal of the work equipment 130.

Thus, during the swing of the swing body 120 caused by inertia after the output of the operation signal is eliminated, the bucket 133 is continuously raised. As a result, it is possible to avoid the situation that the tip of the arm 132 is stopped in a state where the tip of the arm 132 does not rise up to the interference avoidance position P12 thereby the work equipment 130 hits the loading object 200 due to the swing of the swing body 120 caused by inertia.

Then, the vehicle information acquiring unit 1101 acquires vehicle information (step S30). Thus, the vehicle information acquiring unit 1101 is possible to acquire vehicle information after being driven by the output operation signal. The control device 128 returns the process to step S25, and repeatedly executes stop process of the automatic loading.

On the other hand, when the swing speed of the swing body 120 is less than the predetermined speed (step S25: YES), that is, when the swing of the swing body 120 is stopped, the stop processing unit 1108 stops generating the operation signal of the work equipment 130 (step S31). This is because there is no possibility that the work equipment 130 will hit the loading object 200 due to the swing because the swing body 120 is stopped.

When the height of the tip of the arm 132 is equal to or more than the height of the interference avoidance position P12 (step S26: NO), the stop processing unit 1108 stops generating the operation signal of the work equipment 130 (step S31). This is because, since the bucket 133 is moved to a position higher than the loading object 200, there is no possibility that the work equipment 130 will hit the loading object 200 even if the swing body 120 is turned.

Operation and Effects

The loading machine 100 according to the first embodiment generates operation signals for the work equipment 130 and the swing body 120 when receiving the loading command signal, and stops generating an operation signal for swing the swing body when receiving the loading stop command signal. At this time, when the height of the bucket 133 is lower than the loading point P21, the loading machine 100 further generates an operation signal for raising the work equipment 130. Thus, when automatic loading is stopped under some circumstances, the loading machine 100 is possible to prevent the work equipment 130 from hitting the loading object 200 due to the rotation of the swing body 120 caused by inertia after stopping the generation of the operation signal.

In addition, in the loading machine 100 according to the first embodiment, when the height of the bucket 133 becomes a height equal to or higher than the loading point P21, the operation signal for raising the work equipment 130 is stopped. As a result, the loading machine 100 is possible to quickly stop the work equipment 130 after the work equipment 130 has no possibility of hitting the loading object 200.

In addition, in the loading machine 100 according to the first embodiment, when the swing speed of the swing body 120 becomes less than the predetermined speed, the operation signal for raising the work equipment 130 is stopped. As a result, the loading machine 100 can quickly stop the work equipment 130 after the work equipment 130 has no possibility of hitting the loading object 200.

Other Embodiments

One embodiment has been described in detail with reference to the drawings; however, a specific configuration thereof is not limited to those described above, and various design changes and the like can be made.

For example, the operation device 123 of the loading machine 100 according to the first embodiment outputs the loading stop command signal by turning off the alternate switch, but is not limited thereto in other embodiments. For example, a switch other than an alternate switch may be used. Further, the control device 128 of the loading machine 100 according to another embodiment may generate a loading stop command signal by an operation other than the operation with a switch, such as when a swing operation in the opposite direction to the swing direction is performed during automatic loading by the operation device 123. The control device 128 may generate the loading stop command signal when an operation that should not be performed during automatic loading control is performed (for example, a traveling operation). Further, the control device 128 may determine that the vehicle state becomes undesirable for the automatic loading control, such as when a failure (not shown) is detected, and may generate the loading stop command signal.

In addition, the control device 128 of the loading machine 100 according to the first embodiment automatically generates the operation signal of the work equipment 130 after receiving the loading stop command signal, but is not limited thereto. For example, in the loading machine 100 according to another embodiment, after the control device 128 receives the loading stop command signal, the operation device 123 may output the operation signal of the work equipment 130 by the operator's operation. In this case, when the raising speed related to the operation signal output from the operation device 123 is higher than the raising speed related to the automatically generated operation signal, the control device 128 controls the work equipment 130 in accordance with the operation signal output from the operation device 123. On the other hand, when the raising speed related to the operation signal output from the operation device 123 is equal to or lower than the raising speed related to the automatically generated operation signal, the control device 128 controls the work equipment 130 in accordance with the automatically generated operation signal.

In addition, the loading machine 100 according to the first embodiment specifies the loading position P13 and the interference avoidance position P12 based on the three dimensional position of the loading object 200 detected by the detection device 124, but is not limited thereto. For example, the loading machine 100 according to another embodiment may specify the loading position P13 and the interference avoidance position P12 based on the coordinates of the loading object 200 input by the operator. When the loading machine 100 includes an input device such as a touch panel on the operator's seat 122, the control device 128 may specify the loading position P13 and the interference avoidance position P12 by the operator inputting the coordinates of the loading object 200 to the input device. Further, for example, the loading machine 100 according to another embodiment may store the loading operation of the first loading to the loading object 200 manually operated by the operator and specify the loading position P13 and the interference avoidance position P12 based on this loading operation.

Still further in another embodiment, when the loading object 200 is fixed, the loading machine 100 may specify the loading position P13 and the interference avoidance position P12 based on the position of the known loading object 200. For example, when the loading object 200 is a transport vehicle having a vehicle position identification function by the GNSS, the loading machine 100 may acquire information indicating the position and the azimuth direction from the loading object 200 stopped at the loading place and specify the loading position P13 and the interference avoidance position P12 based on this information.

In the embodiment described above, the control device 128 raises up the work equipment 130 for retracting the work equipment 130, but other retracting methods may be used. For example, in another embodiment, the work equipment 130 may be retracted by raising the work equipment 130, or may be retracted by operating the work equipment 130 to a contracted attitude. The contracted attitude of the work equipment 130 means that the boom 131 is raised and the arm 132 is rotated toward the swing body. As a result, the attitude of the work equipment 130 is contracted in the swing radius direction, and when the work equipment 130 is in this attitude, the interference with the loading object 200 may be avoided.

Industrial Applicability

The control device of the loading machine is possible to appropriately control a stop of automatic loading in consideration of the position of the loading object.

The invention claimed is:

1. A control device configured to control an automatic loading operation of a loading machine, the loading machine including a swing body that is configured to swing about a center thereof and a work equipment that is attached to the swing body and has a bucket, the automatic loading operation being configured to cause the bucket to move to a loading position above a transport vehicle and to perform a loading motion to the transport vehicle, the control device comprising a processor that is configured to:

generate an operation signal of the work equipment and the swing body for moving the bucket to the loading position based on receiving a start command of the automatic loading operation;

generate an operation signal for braking a swing of the swing body based on receiving a stop command of the automatic loading operation; and generate an operation signal for raising the work equipment to thereby avoid contact between the bucket and the transport vehicle in response to receiving the stop command of the automatic loading operation while the swing body rotates toward the transport vehicle in a state in which a height of the bucket is lower than the loading position.

2. The control device according to claim 1, wherein the processor is further configured to stop generating the operation signal for raising the work equipment based on the height of the bucket being equal to or higher than the loading position.

3. The control device according to claim 1, wherein the processor is further configured to stop generating the operation signal for raising the work equipment based on a swing speed of the swing body becoming less than a predetermined speed.

4. The control device according to claim 1, wherein the processor is further configured to, based on the height of the bucket being lower than the loading position, generate the operation signal for raising the work equipment until the work equipment reaches a predetermined height or until a swing speed of the swing body becomes less than a predetermined speed in response to the stop command of the automatic loading operation.

5. The control device according to claim 1, wherein the processor is further configured to output (i) a braking control signal to a braking device that is configured to brake a swing motion of the swing body and (ii) the operation signal of the work equipment for raising the work equipment.

6. The control device according to claim 1, wherein the stop command of the automatic loading operation is generated based on an operation of a switch by an operator.

7. The control device according to claim 1, wherein the stop command of the automatic loading operation is generated based on at least one of:
    a swing operation being performed by an operation device in a direction opposite to a swing direction of the swing body during the automatic loading operation, the operation device being provided on the loading machine and configured to operate the loading machine; or
    a traveling operation of the loading machine.

8. The control device according to claim 1, wherein the stop command of the automatic loading operation is generated based on a swing operation being performed by an operation device in a direction opposite to a swing direction of the swing body during the automatic loading operation, the operation device being provided on the loading machine and configured to operate the loading machine.

9. The control device according to claim 1, wherein the stop command of the automatic loading operation is generated based on a traveling operation of the loading machine.

10. The control device according to claim 1, wherein the stop command of the automatic loading operation is generated based on a detection device detecting a failure of the automatic loading operation, the detection device being provided on the loading machine and configured to detect a three dimensional position of an object present in a detecting direction.

11. A control method for controlling an automatic loading operation of a loading machine, the loading machine including a swing body that is configured to swing about a center thereof and a work equipment that is attached to the swing body and has a bucket, the automatic loading operation being configured to cause the bucket to move to a loading position above a transport vehicle and to perform a loading motion to the transport vehicle, the control method comprising:
    generating an operation signal of the work equipment and the swing body for moving the bucket to the loading position based on receiving a start command of the automatic loading operation;
    generating an operation signal for braking a swing of the swing body based on receiving a stop command of the automatic loading operation; and
    generating an operation signal for raising the work equipment to thereby avoid contact between the bucket and the transport vehicle in response to receiving the stop command of the automatic loading operation while the swing body rotates toward the transport vehicle in a state in which a height of the bucket is lower than the loading position.

12. The control method according to claim 11, further comprising:
    based on the height of the bucket being lower than the loading position, generating the operation signal for raising the work equipment until the work equipment reaches a predetermined height or until a swing speed of the swing body becomes less than a predetermined speed in response to the stop command of the automatic loading operation.

13. The control method according to claim 12, further comprising:
    stopping generation of the operation signal for raising the work equipment based on the height of the bucket being equal to or higher than the loading position.

* * * * *